US012572740B2

(12) United States Patent
Zeise et al.

(10) Patent No.: US 12,572,740 B2
(45) Date of Patent: Mar. 10, 2026

(54) MULTI-LANGUAGE DOCUMENT FIELD EXTRACTION

(71) Applicant: SAP SE, Walldorf (DE)

(72) Inventors: Manuel Zeise, Karlsruhe (DE); Marius Lehne, Berlin (DE)

(73) Assignee: SAP SE, Walldorf (DE)

( * ) Notice: Subject to any disclaimer, the term of this patent is extended or adjusted under 35 U.S.C. 154(b) by 353 days.

(21) Appl. No.: 18/168,450

(22) Filed: Feb. 13, 2023

(65) Prior Publication Data

US 2024/0273290 A1     Aug. 15, 2024

(51) Int. Cl.
| | |
|---|---|
| *G06F 40/279* | (2020.01) |
| *G06F 40/126* | (2020.01) |
| *G06F 40/263* | (2020.01) |
| *G06N 3/088* | (2023.01) |

(52) U.S. Cl.
CPC .......... *G06F 40/279* (2020.01); *G06F 40/126* (2020.01); *G06F 40/263* (2020.01); *G06N 3/088* (2013.01)

(58) Field of Classification Search
CPC .... G06F 40/123; G06F 40/205; G06F 40/263; G06F 40/279; G06F 40/284; G06F 40/289; G06F 40/30; G06F 16/93; G06F 40/126; G06N 3/088
See application file for complete search history.

(56) References Cited

U.S. PATENT DOCUMENTS

| | | | | |
|---|---|---|---|---|
| 10,872,236 | B1 * | 12/2020 | Elor | G06V 30/1452 |
| 10,896,357 | B1 * | 1/2021 | Corcoran | G06V 30/1916 |
| 10,949,661 | B2 * | 3/2021 | Bhotika | G06V 30/412 |
| 11,288,719 | B2 * | 3/2022 | Xu | G06V 30/414 |
| 11,977,533 | B2 * | 5/2024 | Thompson | G06V 30/412 |
| 12,182,102 | B1 * | 12/2024 | Matton | G06V 30/10 |
| 12,205,395 | B1 * | 1/2025 | Lam | G06V 30/414 |
| 2010/0083101 | A1 * | 4/2010 | Denoual | G06F 40/143 |
| | | | | 715/242 |

(Continued)

OTHER PUBLICATIONS

Bérard A, Servan C, Pietquin O, Besacier L. MultiVec: a multilingual and multilevel representation learning toolkit for NLP. In Proceedings of the Tenth International Conference on Language Resources and Evaluation (LREC'16) May 2016 (pp. 4188-4192). (Year: 2016).*

(Continued)

*Primary Examiner* — Jesse S Pullias
(74) *Attorney, Agent, or Firm* — Mintz Levin Cohn Ferris Glovsky and Popeo, P.C.

(57)     ABSTRACT

A method for multi-language document field extraction may include determining, based on a received document including a plurality of key fields and a plurality of value fields, a plurality of key-value pairs. The method also includes determining whether an encoding of a key field is within a threshold distance from a predetermined encoding of a predefined key field associated with a predefined field type. The method further includes assigning, based on determining the encoding of the key field is within the threshold distance, the predefined field type to the corresponding key-value pair. The method also includes performing a document processing operation based on each key-value pair and the predefined field type assigned to each key-value pair. Related systems and methods are provided.

18 Claims, 7 Drawing Sheets

500

(56)                References Cited

U.S. PATENT DOCUMENTS

| | | | | | |
|---|---|---|---|---|---|
| 2011/0320481 | A1* | 12/2011 | Huang | ................ | G06F 16/3337 |
| | | | | | 707/769 |
| 2021/0303782 | A1* | 9/2021 | Yamaguchi | ............. | G06F 18/22 |
| 2021/0383067 | A1* | 12/2021 | Reisswig | ................ | G06F 16/93 |
| 2022/0309549 | A1* | 9/2022 | Xu | ....................... | G06V 30/414 |
| 2023/0274568 | A1* | 8/2023 | Paled | ................... | G06V 30/412 |
| | | | | | 382/176 |
| 2024/0169752 | A1* | 5/2024 | Semenov | .............. | G06V 10/82 |
| 2024/0427824 | A1* | 12/2024 | Waller | ................. | G06F 40/295 |

OTHER PUBLICATIONS

Wang et al. "SpanProto: A Two-stage Span-based Prototypical Network for Few-shot Named Entity Recognition". arXiv:2210. 09049v2 [cs.CL] Nov. 21, 2022 (Year: 2022).*

* cited by examiner

Document Processing Engine 110

Extractor
162

Model
164

Network 130

User
Interface
125

Client Device 120

User 140

Database 150

Key Information
155

300

400

500

600

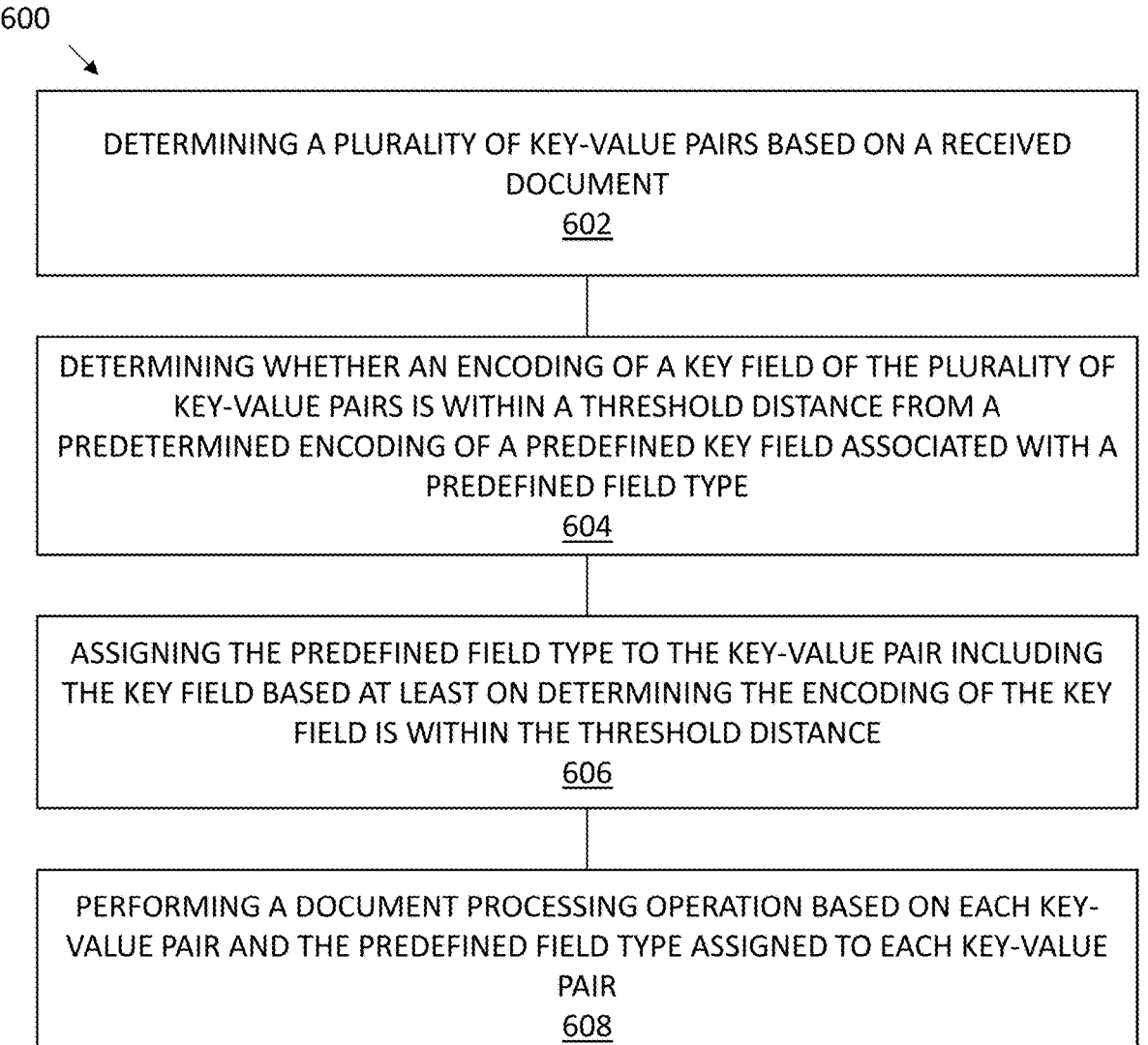

DETERMINING A PLURALITY OF KEY-VALUE PAIRS BASED ON A RECEIVED DOCUMENT
602

DETERMINING WHETHER AN ENCODING OF A KEY FIELD OF THE PLURALITY OF KEY-VALUE PAIRS IS WITHIN A THRESHOLD DISTANCE FROM A PREDETERMINED ENCODING OF A PREDEFINED KEY FIELD ASSOCIATED WITH A PREDEFINED FIELD TYPE
604

ASSIGNING THE PREDEFINED FIELD TYPE TO THE KEY-VALUE PAIR INCLUDING THE KEY FIELD BASED AT LEAST ON DETERMINING THE ENCODING OF THE KEY FIELD IS WITHIN THE THRESHOLD DISTANCE
606

PERFORMING A DOCUMENT PROCESSING OPERATION BASED ON EACH KEY-VALUE PAIR AND THE PREDEFINED FIELD TYPE ASSIGNED TO EACH KEY-VALUE PAIR
608

MULTI-LANGUAGE DOCUMENT FIELD EXTRACTION

TECHNICAL FIELD

The subject matter described herein relates generally to document processing and more specifically to multi-language document field extraction.

BACKGROUND

Enterprise software applications process scanned documents by extracting text and other information from those documents and converting the extracted text into database entries that can be used for various purposes. The manner in which the text or other information is extracted from the documents and/or the application of such extracted information may depend on a language used in the document. However, conventional approaches to extracting information from documents are generally not specific or robust enough to reliably identify the meaning of the extracted information in various languages. Thus, conventional approaches may be unable to determine or may inaccurately determine the meaning of extracted text or other information from documents.

SUMMARY

Systems, methods, and articles of manufacture, including computer program products, are provided for multi-language document field extraction. In one aspect, there is provided a system including at least one data processor and at least one memory. The at least one memory may store instructions that cause operations when executed by the at least one data processor. The operations may include: determining, based on a received document including a plurality of key fields and a plurality of value fields, a plurality of key-value pairs. Each key-value pair of the plurality of key-value pairs includes a key field of the plurality of key fields and a value field of the plurality of value fields that corresponds to the key field. The operations also include determining whether an encoding of the key field is within a threshold distance from a predetermined encoding of a predefined key field associated with a predefined field type. The encoding includes a numeric representation of the key field. The operations also include assigning, based at least on determining the encoding of the key field is within the threshold distance, the predefined field type to the key-value pair including the key field. The operations also include performing a document processing operation based on each key-value pair and the predefined field type assigned to each key-value pair.

In another aspect, there is provided a method for multi-language document field extraction. The method may include: determining, based on a received document including a plurality of key fields and a plurality of value fields, a plurality of key-value pairs. Each key-value pair of the plurality of key-value pairs includes a key field of the plurality of key fields and a value field of the plurality of value fields that corresponds to the key field. The method also includes determining whether an encoding of the key field is within a threshold distance from a predetermined encoding of a predefined key field associated with a predefined field type. The encoding includes a numeric representation of the key field. The method also includes assigning, based at least on determining the encoding of the key field is within the threshold distance, the predefined field type to the key-value pair including the key field. The method also includes performing a document processing operation based on each key-value pair and the predefined field type assigned to each key-value pair.

In another aspect, there is provided a computer program product that includes a non-transitory computer readable storage medium. The non-transitory computer-readable storage medium may include program code that causes operations when executed by at least one data processor. The operations may include: determining, based on a received document including a plurality of key fields and a plurality of value fields, a plurality of key-value pairs. Each key-value pair of the plurality of key-value pairs includes a key field of the plurality of key fields and a value field of the plurality of value fields that corresponds to the key field. The operations also include determining whether an encoding of the key field is within a threshold distance from a predetermined encoding of a predefined key field associated with a predefined field type. The encoding includes a numeric representation of the key field. The operations also include assigning, based at least on determining the encoding of the key field is within the threshold distance, the predefined field type to the key-value pair including the key field. The operations also include performing a document processing operation based on each key-value pair and the predefined field type assigned to each key-value pair.

In some variations of the methods, systems, and non-transitory computer readable media, one or more of the following features can optionally be included in any feasible combination. In some aspects, the key field of the plurality of key-value pairs is associated with a first language and the predefined key field is associated with a second language different from the first language.

In some aspects, the threshold distance includes a minimum of a pre-defined value and a threshold value including half a distance between the predetermined encoding of the predefined key field and a closest second predetermined encoding of a second predefined key field associated with a second predefined field type.

In some aspects, the threshold distance is at least one of a cosine similarity, an L1 norm, a L2 norm, a Chebyshev distance.

In some aspects, the method includes iteratively determining whether the encoding of the key field is within the threshold distance from a plurality of predetermined encodings including the predetermined encoding until a distance between the encoding and the predetermined encoding is determined to be within the threshold distance.

In some aspects, the method includes determining, based on the received document, a dense representation of a table included in the received document. The dense representation includes an encoding of column headers of pairs of column headers and column values of the table. The method includes determining whether the encoding of a column header of a pair of column headers and column values is within a table threshold distance from a predetermined table encoding of a predefined column header associated with a predefined column type. The method includes assigning, based on determining the encoding of the column header is within the table threshold distance, the predefined column type to the pair of column headers and column values. The method includes performing the document processing operation based on the assigned predefined column type and the pair of column headers and column values.

In some aspects, the encoding of the key field of the plurality of key-value pairs is generated based at least on context information associated with one or more nearby key fields, and the encoding of the key field is generated by at least masking one or more key fields of the received document that include a numeric digit.

In some aspects, the encoding is determined by a trained language model trained, based on a plurality of annotated documents including a plurality of languages, to identify the predefined field type.

In some aspects, the document processing operation includes at least one of applying an extraction model to the received document based on the assigned predefined field type and the key-value pair, applying correction logic to the received document based on the assigned predefined field type and the key-value pair to correct a value extracted from the received document, and applying a custom extraction model based on the assigned predefined field type and the key-value pair.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to multi-language document field extraction, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 depicts a flowchart illustrating an example of a process for multi-language document field extraction, in accordance with some example embodiments.

When practical, similar reference numbers denote similar structures, features, or elements.

DETAILED DESCRIPTION

Figure 1:
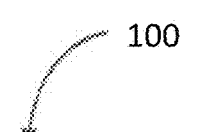
FIG. 1 depicts a system diagram illustrating a document field identification system, in accordance with some example embodiments.

A software application, such as an enterprise software application, may be used to extract logical entities or document features from scanned documents (e.g., invoices, purchase orders, order confirmations, payment advice). The document features may include header information, such as a document date, a sender name, a sender bank account, a sender tax identifier, a total amount, etc., and line item information included in tables with fields, such as line item text, line item quantity, or line item amount.

Generally to extract such information, after uploading a scanned document, the document is first processed with an optical character recognition (OCR) solution to yield the text on the document. After, one or more modules of the software application can extract some or all document features based on the image and/or the text information from the OCR step. The modules can contain rule-based extraction heuristics, neural network-based extraction models, such as DocumentReader, Chargrid or Charmer, or post-processing logic, such as sender address harmonization and matching. A message-based orchestration layer of the software application controls the execution of the different modules, merges the results of the different modules, and persists the results so they can finally be retrieved by a user or an embedding solution.

Generally, neural network-based models deployed in the software application are document-specific, global models. For example, the document-specific, global models may include one model extracting information from one document type (e.g., invoices) in all supported languages, and another model extracting information from another document type (e.g., purchase orders) in all supported languages. The models are generally trained using a large corpus of documents of the same document type in different languages to ensure the model learns to extract the document features for arbitrary document layouts. Thus, these models rely on a large amount of training documents, and may be limited by a particular language or document type.

Documents may include various values and labels (e.g., keys or key fields) that indicate the meaning of the values. While document layouts may be similar across countries and languages, the labels indicating the meaning of a particular value may vary across languages. For example, a label, such as "Due date," in front of a value identifies the value as due date. However, conventional models are not capable of determining that "due date" indicates a due date field in the same was as an equivalent term in another language (e.g., "Fälligkeitsdatum" in German). As a result, the quality and accuracy in determining the meaning of values within a document, extracting such values, and categorizing such values suffers and is dependent on the availability of a large quantity of training documents in each language. As a result, models may generally inaccurately extract information from documents in languages that do not appear frequently.

To address such issues, some software applications use language models to process text information and convert words or sentences information into representations in latent spaces. These representations are then used for information retrieval tasks or question-answer systems. Additionally, language models may allow for multi-language support in visually rich document understanding tasks. However, as noted, such language models rely on a large quantity of training documents in each language, may need to be fine-tuned to handle custom documents or custom fields, and/or the like. Thus, existing software applications using such language models can be computationally expensive and may not allow for unattended processing of documents.

Unlike such conventional approaches, the document field identification system described herein may extract key value pairs in multiple languages and/or may rely on only a small set of documents for training a model. Additionally and/or alternatively, training the model does not rely on training or fine-tuning a neural network, and as a result, operates without supervision. Accordingly, the document field identification system described herein reliably and accurately and consistently assigns field types to key fields in the key value pairs, regardless of the language used in the document.

For example, the document field identification system consistent with embodiments of the current subject matter may receive a document in a language, such as an infrequently used language, and determine, based on the received document, a plurality of key-value pairs including a key field and a value corresponding to the key field. The document field identification system may determine an encoding of the key field, and determine whether the encoding is within a threshold distance from a predetermined encoding of a predefined key field associated with a predefined field type. The document field identification system may further determine the encoding of the key field is within the threshold distance. Based on such determination, the document field identification system may assign the predefined field type to a key-value pair of the plurality of key-value pairs including the key field. The assigned predefined field type and the corresponding key-value pair may be used for performing one or more document processing operations. For example, as noted, one or more models may be applied to the document based on the assigned predefined field type and the corresponding key-value pair, the assigned predefined field type and the corresponding key-value pair may be used for payment of an invoice, to create a purchase order, and/or the like.

FIG. 1 depicts a system diagram illustrating a document field identification system 100, in accordance with some example embodiments. Referring to FIG. 1, the document field identification system 100 may include a document processing engine 110, a database 150, and a client device 120. The document processing engine 110 may include one or more machine learning models or other models for processing a document based on a field type identified by the document processing engine 110. For example, the document processing engine 110 may include an extractor 162, a model 164, and/or the like for processing one or more documents, as described herein.

As shown in FIG. 1, the document processing engine 110, the database 150, and the client device 120 may be communicatively coupled via a network 130. The network 130 may be any wired and/or wireless network including, for example, a public land mobile network (PLMN), a wide area network (WAN), a local area network (LAN), a virtual local area network (VLAN), the Internet, and/or the like. As noted, the document processing engine 110 may accurately determine and assign a field type to a key-value pair within a document, such as a document received via the client device 120, regardless of the language used in the document. The document processing engine 110 may include at least one data processor and at least one memory storing instructions, which when executed by the at least one data processor cause one or more operations as described herein.

The client device 120 may be a processor-based device including, for example, a smartphone, a tablet computer, a wearable apparatus, a virtual assistant, an Internet-of-Things (IoT) appliance, and/or the like. The client device 120 may interact with the document processing engine 110 to determine an encoding (e.g., a predetermined encoding) of a predefined key field, a predefined field type associated with the predefined key field, and/or a threshold distance, which are stored in the database 150 as key information 155.

As shown in FIG. 1, the document processing engine 110 may be associated with a user interface 125 of the client device 120. The user interface 125 may receive, from a user 140 at the client device 120, one or more inputs including one or more documents. The one or more documents may be original documents and/or scanned images of the documents. The one or more documents may include invoices, purchase orders, order confirmations, payment advice, and/or the like. The one or more documents may be received from the user 140. The one or more documents may be associated with a particular sender or vendor such that the one or more documents received from the particular sender or vendor have a document layout and/or are associated with different document types. For example, the one or more documents may be associated with a particular transaction such that the one or more documents associated with the particular transaction and vendor. Additionally and/or alternatively, the documents may be include one or more languages, such as languages from different countries (e.g., countries in which the documents originated, the country of origin of the transaction associated with the document, the country associated with the vendor or sender, and/or the like).

In some embodiments, the one or more inputs additionally and/or alternatively include a selection of one or more key fields and/or value fields within the one or more documents, as described in more detail below. Additionally and/or alternatively, the document processing engine 110 may communicate with the user interface 125 to display, via the user interface 125 the received document, an assigned field type, key-value pairs, and/or the like.

Figure 2:
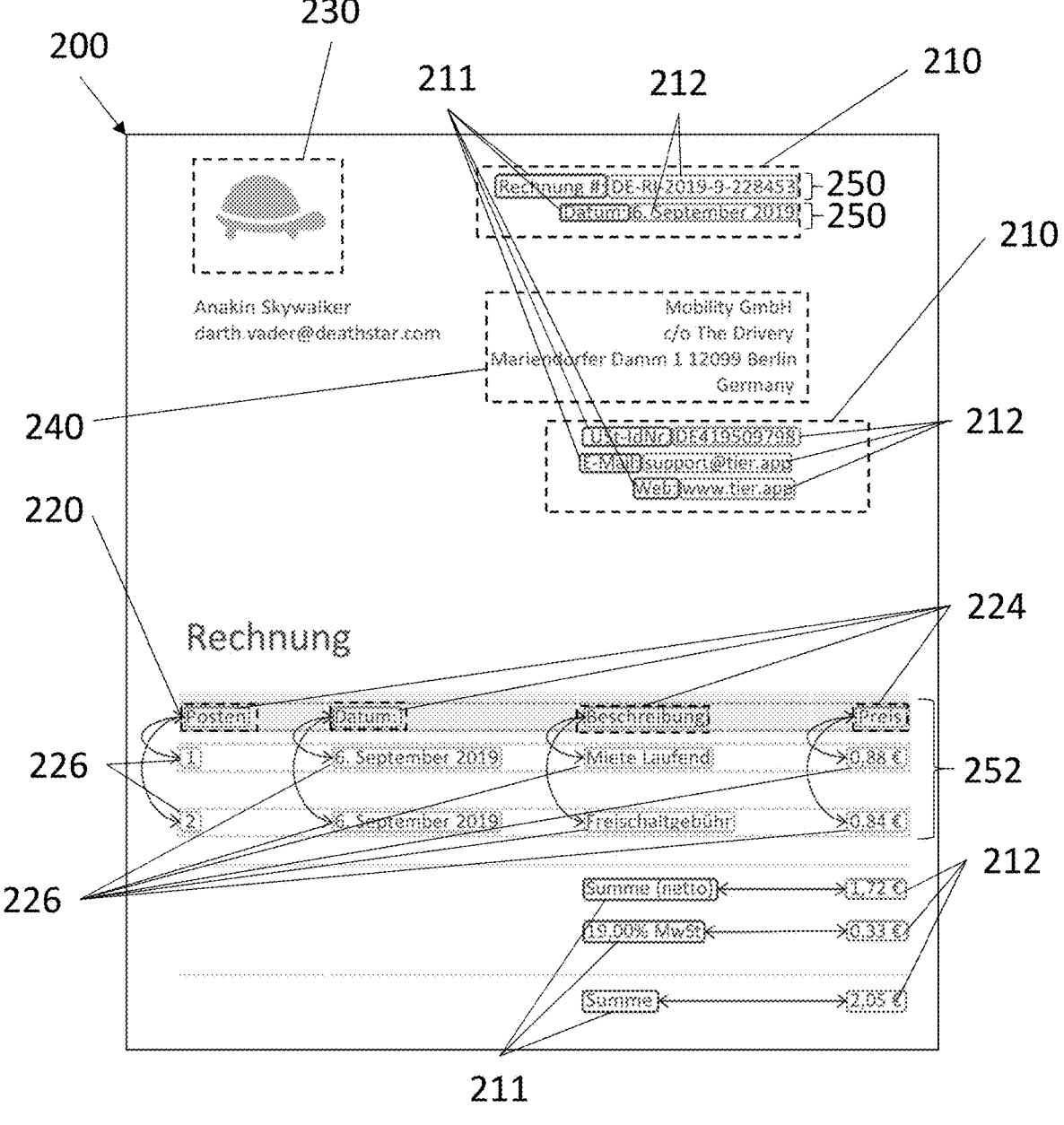
FIG. 2 depicts an example document, in accordance with some example embodiments.

FIG. 2 depicts an example document 200 that may be received via the user interface 125, in accordance with some example embodiments. The document 200 may include one or more document fields, such as one or more document header fields 210, one or more table header fields 220, one or more logos 230 (e.g., a logo of the sender or vendor associated with the document 200), and/or sender information 240, among other document fields.

Referring to FIG. 2, the one or more document header fields 210 may include text associated with a particular position within the document 200. For example, the one or more document header fields 210 may generally be positioned at or near a top of the document 200. However, the one or more document header fields 210 may additionally and/or alternatively be positioned at other locations within the document 200 such as below a table, and/or the like. In some embodiments, the one or more document header fields 210 may each be positioned at and/or associated with a particular spatial position within the document 200. The one or more document header fields 210 may include one or more field types, such as a document number, a date, a tax identification number, an e-mail address, a website, and/or the like. Documents of a same type, regardless of the language used in the document, may include a same type of document header field 210, but the language used to identify the particular document header field 210 may be different.

In some implementations, the document header fields 210 include one or more key-value pairs 250. A key-value pair 250 may include a key field 211 and a value field 212. The key field 211 may represent a label indicating a meaning of the corresponding value field 212. As an example, in the document 200, the "Datum" key field is a label that indicates the meaning of the corresponding value field "6 Sep. 2019." The value field may include an alphabetic, numeric, alpha-numeric, etc. value associated with each of the key fields. Thus, the one or more key-value pairs 250 may each include a key field 211 and a corresponding value field 212. Each of the key-value pairs 250 may also have an associated field type indicating the type of the key field 211 and value field 212 to provide meaning to the key-value pairs 250. Other documents having a similar type may have the key-value pairs 250 and field types assigned to the key-value pairs 250, but in a different language.

The one or more table header fields 220 may include text associated with a column header 224 in a table presented within the document 200. In some implementations, the column headers 224 represent key fields (e.g., the key field 211) in a key-value pair 252, within the table presented in the document 200. The one or more column headers 224 (e.g., the key fields) may be associated with a particular value (e.g., an alphabetic, numeric, alphanumeric, etc. value) and/or a particular position within the table and/or the document 200. These values fields may represent the value field 226 (e.g., the value field 212) associated with the corresponding column headers 224 or table header fields 220. As an example, the one or more column headers 224 includes field types, such as an item line-item number, a date associated with the line-item number, a corresponding description, a corresponding price, and/or the like. These field types may be assigned to the key-value pairs 252 including the column headers 224 and corresponding column values 226. Other documents having a similar type may have the key-value pairs 252 and field types assigned to the key-value pairs 252, but in a different language.

Referring back to FIG. 2, the document 200 may include one or more logos 230. The one or more logos 230 may be associated with the sender or vendor, and/or the like. The one or more logos 230 may include an image and/or text. The one or more logos 230 may be associated with a particular spatial position within the document 200. As an example, in the document 200, the logo 230 is positioned in the upper left corner of the document 200.

Again referring to FIG. 2, the sender information 240 may be associated with the vendor or sender of the document 200. The sender information 240 may be associated with a recipient of the document 200. The sender information 240 may include a name, address, geographic location, telephone number, and/or the like associated with the vendor or sender of the document 200. The sender information 240 may be associated with a particular spatial position within the document 200.

In some implementations, the key-value pairs 250, 252 (which may be collectively described herein as key-value pairs 250) may be stored in the database 150 as key information 155. The key information 155 may also include spatial or other contextual information associated with the key fields (e.g., the key fields 211, 224) and/or the value fields (e.g., the value fields 212, 226) corresponding to the key fields. In some implementations, the key information 155 additionally and/or alternatively includes a predetermined encoding (e.g., a numerical representation) of the key fields and/or value fields of the key-value pairs 250, a predefined field type associated with the key fields, value fields, and/or key-value pairs 250, a threshold distance associated with the predetermined encoding, and/or the like. Accordingly, at least some of the key information 155 may be determined by the extractor 162 and/or the model 164, such as during training of the model 164, which is described in more detail below.

The key information 155 may be determined based on a plurality of sample documents, such as the document 200. For example, the key information 155 may be extracted from the plurality of sample documents and/or determined based on the plurality of sample documents during a training process in which the extractor 162 and the model 164 are applied to the plurality of sample documents.

The document processing engine 110 may receive a sample document. For example, the user 140 may upload the sample document via the client device 120 for determination of the key information 155. The sample document may, for example, include the document 200. In some embodiments, the sample document includes a plurality of sample documents having the same layout and/or the same document type in one or more (e.g., a plurality of) different languages. This allows for determination of the key information 155 based on the plurality of sample documents.

The document processing engine 110 (e.g., the extractor 162) may process the sample document (e.g., the plurality of sample documents). In some embodiments, to extract at least some of the key information 155, after uploading the document (e.g., the sample document), the document is first processed with optical character recognition (OCR) to yield the text on the document. The extractor 162 may include rule-based extraction heuristics, neural network-based extraction models, such as DocumentReader, Chargrid or Charmer, or post-processing logic, such as sender address harmonization and matching.

The extractor 162 may be a global model such that the extractor 162 is generally applied to all documents in languages to be supported. Additionally and/or alternatively the extractor 162 may be applied to all sample documents of a particular document type (e.g., invoice, purchase order, and/or the like) in various languages. The extractor 162 may be a neural network, or another machine learning model.

Figure 4:
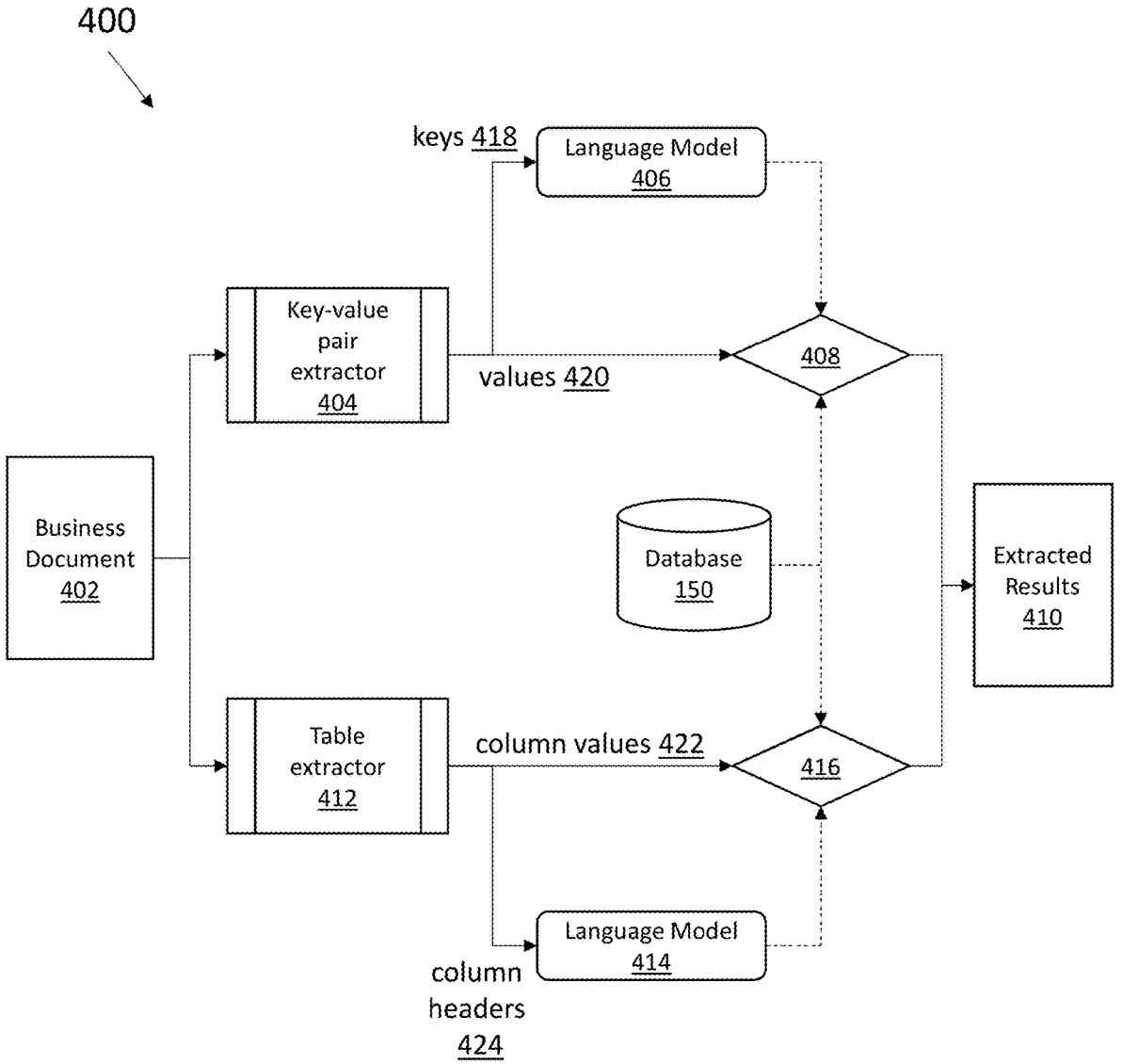
FIG. 4 depicts an example process for identifying document field types, in accordance with some example embodiments.

The extractor 162 may include a key-value pair extractor (e.g., key-value pair extractor 404 shown in FIG. 4) and a table extractor (e.g., table extractor 412 shown in FIG. 4). The key-value pair extractor may identify key fields or labels (e.g., "Due date") and value fields (e.g., May 4, 1977) in a document, such as the document 200, regardless of the field type. The connection between key fields and corresponding value fields may be defined via the spatial relationship of two extracted fields (e.g., key fields and/or value fields) and the general arrangement of fields for a specific layout of a document. Thus, the key-value pair extractor may also extract contextual or spatial information associated with each of the key fields and/or value fields. In other words, the key-value pair extractor operates on the document (e.g., the document 200) and/or on the result of OCR applied to the document, which yields text boxes with spatial information.

In some embodiments, the table extractor extracts tables in a dense format. The dense format may include line items, columns (e.g., value fields), and column headers (e.g., key fields), yielding pairs of column headers and column values (which may be the same or similar to the key-value pairs including key fields and value fields). The connection between column header fields and corresponding column fields may be defined via the spatial relationship of two extracted fields (e.g., column header fields and/or column value fields), such as a column in which the column value fields are positioned and the general arrangement of fields for a specific layout of a document. While FIG. 2 illustrates an example of the document 200, nested column value or line item fields (e.g., when line item quantity and line item unit price are presented within the same cell of the table one below the other) may also be extracted based on the formatting of the table fields and the structural layout of the table. Thus, the table extractor may also extract contextual or spatial information associated with each of the column header fields and/or column value fields. In other words, the table extractor operates on the document (e.g., the document 200) and/or on the result of OCR applied to the document, which yields text boxes with spatial information and/or the dense format. In some instances, the extractor 162 is a single extractor that extracts the key fields and/or the value fields from the document regardless of whether or not the fields are located in a table.

In some embodiments, the key fields (including the column header fields) and the value fields (including the column value fields) extracted from the sample document by the extractor 162 are presented to the user 140 via the interface 125 of the client device 120 as predetermined key fields and/or value fields. Via the user interface 125, the user 140 may select the key-value pairs and columns from the table in the sample document to be extracted during processing of one or more documents. In this way, the user 140 may define mandatory fields within the sample document. For example, the document processing engine 110 may receive a selection of one or more key fields (including the column header fields) and value fields (including the column value fields) of interest. The document processing engine 110 may also receive an assigned or predefined field type corresponding to at least the selected key-value pairs and columns. The field type, indicating a type of the key field of each key-value pair and/or the type of column, may provide meaning to the key-value pair and/or column of the table. The field type, for example, may include a document identifier, a date, an e-mail address, a website, a total invoice amount, a tax rate, and/or the like. The field type may be stored in the database 150 as part of the key information 155.

The assigned field types may be annotations that are used for training the model 164. The model 164 may be a machine learning model, such as neural network, including a neural network-based language model, and/or the like. The model 164 may be a pretrained language model supporting different languages. For example, the model 164 may be an mBert, an XLNet, an XLM-RoBERTa, or a tf-idf-based model.

The model 164 may determine an encoding of the extracted key fields (including the column header fields), based at least on the annotated sample documents including the selected key-value pairs (or column header-column value pairs), assigned field types, and/or the like. For example, the model 164 may be trained, such as based on the annotated sample documents, to determine the encoding.

The encoding may include a numeric representation, such as a numeric representation in a latent space. The numeric representation may be a vector that includes values (e.g., numeric values or the like), a coordinate associated with the key fields and/or corresponding value fields, a coordinate associated with one or more pixel values, one or more extracted image features, and/or the like. Accordingly, the model 164 may use context information, such as spatial information, associated with the extracted key fields, value fields, or other nearby fields, to encode a specific key fields and/or value fields. Thus, the numeric representation preserves the characteristics of the key fields and/or value fields, while exploiting the latent space.

In some embodiments, value fields, corresponding to the key fields to be encoded, are masked or encoded with a dedicated token during the encoding process to reduce or prevent influence of the specific value on the encoding. In other words, the encoding may include a representation, such as a numeric representation, of only the text of the key fields and in some embodiments, may not include any numeric values. The encoding of each predetermined key field is stored in the database 150 as part of the key information 155 together with the predefined field types. The model 164 determines the encoding for each field type within the sample document.

Additionally and/or alternatively, the document processing engine 110 determines and stores a threshold distance with the encoding of each predetermined key field and predefined field type. The threshold distance may be determined as a cosine similarity, an L1 norm (Manhattan distance), an L2 norm (Euclidian distance), a Chebyshev distance, or another distance measurement between two encodings (e.g., numeric representations).

The threshold distance may include a minimum of a pre-defined value (e.g., received via the interface 125 from the user 140) and a threshold value being half a distance between a predetermined encoding of a predefined key field having a first predefined field type and a closest second predetermined encoding of a second predefined key field associated with a second predefined field type different from the first field type. In other words, the threshold distance may be the minimum of a predefined value and half the distance to the closest embedding of a key field of a different field type. For example, if the encoding of the "invoice date" key field is closer to the encoding of the "due date" key field than the predefined value, the threshold would be half the distance between the encoding of the "invoice date" key field and the encoding of the "due date" key field rather than the predefined value.

Figure 3:
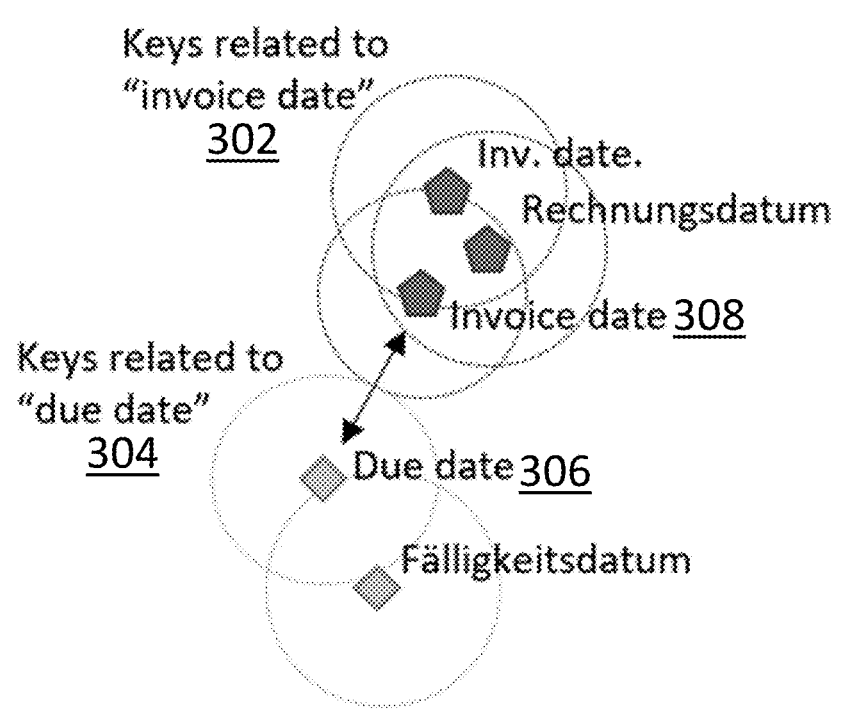
FIG. 3 depicts a visualization of an encoding of key fields in a two-dimensional latent space, in accordance with some example embodiments.

As an example, FIG. 3 illustrates an example visualization of a two-dimensional latent space 300 showing encodings of different field types, in accordance with some example embodiments. As shown in FIG. 3, the model 164 encodes key fields having a same field type in a similar area of the latent space, such as within one or more key field clusters. For example, the model 164 may encode key fields having a "due date" field type in a first cluster 304 and key fields having an "invoice date" key field in second cluster 302, regardless of the language or format of the specific key field used in the document. In this example, the first cluster 304 includes encodings of key fields "due date" and "Fälligkeitsdatum," which are both related to the "due date" key field type and the second cluster 302 includes encodings of key fields "inv. date," "invoice date," and "Rechnungsdatum," which are all related to the "invoice date" key field type. Thus, each of the encodings in each cluster may represent related key fields having the same key field type that are included in documents in different languages and/or formats.

Each key field cluster, such as the first cluster 304 and/or the second cluster 302 may be defined by the threshold distance described herein. For example, as noted, the threshold distance may be a predefined value. In other words, the predefined value may define the radius surrounding each cluster, indicating the field type of the encodings included in each cluster. In some embodiments, encodings of two key fields of different key field types (e.g., due date and invoice date in the example shown in FIG. 3) may be too close to one another such that the two key fields would be included in more than one key field cluster. In this scenario, the threshold distance would be reduced so that the encodings of the two key fields would not be included in more than one key field cluster. In this scenario, the threshold distance would be half a distance between the encoding of the key field having the first field type (included in the first cluster 304) and a closest encoding of another key field associated with a different field type (included in the second cluster 302).

Referring to the example shown in FIG. 3, a first encoding 306 of the "due date" key field and a second encoding 308 of the "invoice date" key field may fall within both the first cluster 304 and the second cluster 302 based on the predefined threshold value. To ensure that the first encoding 306 and the second encoding 308 fall within a single one of the first cluster 304 and the second cluster 302, and that a new given encoding situated between the first cluster 306 and the second cluster 308 in the otherwise "overlapping area" can be assigned unambiguously to one of the two clusters (e.g., not to both at the same time), the document processing engine 110 would instead determine the threshold distance to be half the distance between the first encoding 306 and the closest encoding (e.g., the second encoding 308) of a key field of a different field type. As a result, in the example shown in FIG. 3, the threshold distance used for the first encoding 306 and the second encoding 308 would be half the distance (e.g., cosine similarity, L1 norm (Manhattan distance), L2 norm (Euclidian distance), Chebyshev distance, or the like) between the first encoding 306 and the second encoding 308. For each extracted key field and/or key-value pair (including the column header-column value pairs), the document processing engine 110 stores the determined key information 155, including the encoding of the key field, the field type associated with the encoded key field, the determined threshold distance, and/or the like, in the database 150 for use at inference.

Consistent with implementations of the current subject matter, the document processing engine 110 may process documents received via the client device 120 to accurately and efficiently determine one or more key-value pairs within a document, regardless of the language used in the document and/or format of the key fields used in the document. FIG. 4 illustrates an example process 400 for identifying the key-value pairs, in accordance with some example embodiments.

Referring to FIG. 4, at 402, the document processing engine 110 receives a business document. For example, the user 140 may upload the document via the client device 120 for processing. In other embodiments, the document processing engine 110 may receive the document from another software application, system, and/or the like. The document may, for example, include the document 200 and/or one or more aspects of the document 200.

As described herein, the document may include one or more document features, such as one or more document header fields, one or more table header fields, one or more logos, sender information, and/or the like. The document processing engine 110 may, based on the received document, extract the one or more document features from the received document. The document may include a language, such as a language supported by the document processing engine 110 and/or a new language. For example, the one or more document features may be written in a language that is the same as or different from one or more languages generally handled by the document processing engine 110. Accordingly, the document processing engine 110 can handle documents by, for example, determining one or more field types associated with one or more key-value pairs, regardless of the language used in the received document.

For example, at 404, the document processing engine 110 may apply the key-value pair extractor (e.g., the extractor 162) to the received document. The key-value pair extractor may extract one or more key fields 418 and value fields 420 from the document. In some embodiments, the key-value pair extractor yields a list or set of key-value pairs included within the document. For example, the key-value pair extractor may determine the value fields corresponding to each of the key fields to determine each key-value pair. Thus, the document processing engine 110 may determine the plurality of key-value pairs based on the received document including the plurality of key fields and value fields.

At 406, document processing engine 110 (e.g., via a machine learning model, such as the model 164 trained during the training phase described herein) may determine an encoding of at least the key fields 418 of each key-value pair. The encoding may include a representation, such as a numeric representation, of the key fields 418. The encoding of the key fields 418 may be generated based at least on context information associated with one or more nearby key fields 418 and/or spatial information associated with the key fields 418. As described herein, the context information may include spatial information (e.g., the size and/or position of the key fields 418 in the received document, a coordinate such as an x-coordinate and/or a y-coordinate of the key fields 418 in the received document, and/or the like). In some embodiments, the encoding of the key fields 418 is generated by at least masking one or more key fields or value fields of the received document that include a numeric digit.

In some implementations, each of the key-value pairs (or key fields of each key-value pair) may be associated with a different field type. The document processing engine 110 may determine and/or assign the field type to each of the key-value pairs. To do so, at 408, the document processing engine 110 iterates over the stored key information 155 from the database 150. For example, the document processing engine 110 accesses the stored key information 155, including the predetermined encodings of the predefined key fields, the predefined field types of each of the predetermined key fields, the predefined thresholds associated with each of the predetermined key fields, and/or the like.

The document processing engine 110 may iterate over the stored key information 155 until the document processing engine 110 determines whether the encoding (determined at 406) of the key field 418 is within a threshold distance (e.g., the threshold distance stored as part of the key information 155) from a predetermined encoding of a predefined key field associated with a predefined field type stored in the database 150 as at least a part of the key information 155.

For example, the document processing engine 110 determines (e.g., iteratively) a distance between the encoding (determined at 406) of the key field 418 and one or more of the predetermined encodings stored in the database 150. The distance may be at least one of a cosine similarity, an L1 norm, an L2 norm, a Chebyshev distance, and/or the like.

The document processing engine 110 compares the distance to the threshold distance, such as the threshold distance associated with each of the predetermined encodings stored in the database 150. The document processing engine 110 may continue to determine the distances and compare the distances to the threshold distances until the document processing engine 110 determines the distance is within (e.g., less than or equal to) a particular threshold distance stored as at least a part of the key information 155. In accordance with some example embodiments, the threshold distance includes a minimum of a pre-defined value and a threshold value including half a distance between the predetermined encoding of the predefined key field and a closest second predetermined encoding of a second predefined key field associated with a second predefined field type. And, as noted, the threshold distance may have been determined during the training phase and stored in the database 150 for each predetermined encoding.

In some embodiments, based on determining the distance between the encoding of the key field 418 and a particular predetermined encoding is within the associated threshold distance, the document processing engine 110 assigns the predefined field type (assigned to the predetermined encoding) to the key field 418 and/or the key-value pair including the particular key field 418. The document processing engine 110 may do so for each key field 418 and/or key-value pair extracted at 404.

In some embodiments, the document processing engine 110 does not assign the predefined field type to the key field 418 when the document processing engine 110 determines that the distance between the encoding of the key field 418 is not within any threshold distance associated with the predetermined encodings stored in the database 150. In such embodiments, the document processing engine 110 leaves the key-value pair including such key field unassigned.

Figure 5:
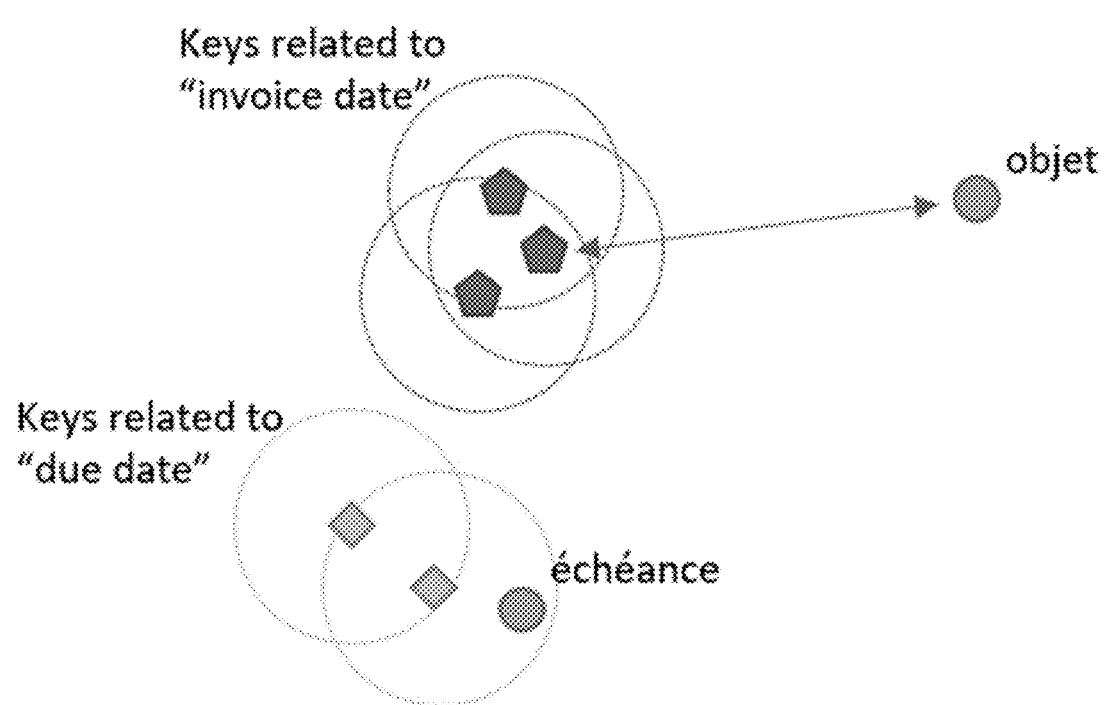
FIG. 5 depicts a visualization of an encoding of key fields in a two-dimensional latent space, in accordance with some example embodiments.

As an example, FIG. 5 illustrates a visualization 500 of an encoding of key fields in a two-dimensional latent space, in accordance with some example embodiments. As shown in the visualization 500, the document processing engine 110 has determined the encoding of the key field "échéance" is within the predefined threshold distance of the key fields having the predefined field type, "due date." For example, the document processing engine 110 has determined the encoding of the key field "échéance" is within the key cluster associated with the field type "due date." As such, the document processing engine 110 would assign the predefined field type of "due date" to the key field "échéance." Further, as shown in the visualization 500, the document processing engine 110 has determined the encoding of the key field "objet" is not within the predefined threshold distance of any of the key fields having the predefined field type "due date" or "invoice date." For example, the document processing engine 110 has determined the encoding of the key field "objet" is not within the key cluster associated with the field type "due date" or the key cluster associated with the field type "invoice date." As such, the document processing engine 110 would not assign a predefined field type to the key field "objet."

The document processing engine 110 may compile a list of the key-value pairs and the assigned field types at 410 for further processing. For example, the document processing engine 110 may perform a document processing operation based on each key-value pair and the predefined field type assigned to each key-value pair included in the list. The document processing operation may include at least one of applying an extraction model to the received document based on the assigned predefined field type and the key-value pair, applying correction logic to the received document based on the assigned predefined field type and the key-value pair to correct a value extracted from the received document, and applying a custom extraction model based on the assigned predefined field type and the key-value pair, among other operations.

Again referring to the process 400 shown in FIG. 4, at 412, the document processing engine 110 may apply the table extractor (e.g., the extractor 162) to the received document. The table extractor may extract one or more column header fields 424 and column value fields 422 from the document. As noted herein, the one or more column header fields 424 and the column value fields 422 may be extracted during extraction of the key fields 418 and the key value fields 420, respectively. In some embodiments, the table extractor yields a dense representation of the table including a list or set of column header-column value pairs (e.g., similar to or the same as the key-value pairs) included within the document. For example, the table extractor may determine the column value fields corresponding to each of the column header fields to determine each column header-column value pairs. Thus, the document processing engine 110 may determine the plurality of column header-column value pairs based on the received document including the plurality of column header fields and column value fields.

At 414, document processing engine 110 (e.g., via a machine learning model, such as the model 164 trained during the training phase described herein) may determine an encoding of at least the dense representation, the column header fields 424, and/or the like of each column header-column value pair. The encoding may include a representation, such as a numeric representation, of the column header fields 424. The encoding of the column header fields 424 may be generated based at least on context information (e.g., the size and/or position of the column header fields 424 in the received document, a coordinate such as an x-coordinate and/or a y-coordinate of the column header fields 424 in the received document, and/or the like) associated with one or more nearby column header fields 424 and/or spatial information associated with the column header fields 424. In some embodiments, the encoding of the column header fields 424 is generated by at least masking one or more column header fields or column value fields of the received document that include a numeric digit.

In some implementations, each of the column header-column value pairs (or column header fields of each column header-column value pair) may be associated with a different field type. The document processing engine 110 may determine and/or assign the field type to each of the column header-column value pairs. To do so, at 416, the document processing engine 110 iterates over the stored key information 155 from the database 150. For example, the document processing engine 110 accesses the stored key information 155, including the predetermined encodings of the predefined column header fields, the predefined field types of each of the predetermined column header fields, the predefined thresholds associated with each of the predetermined column header fields, and/or the like.

The document processing engine 110 may iterate over the stored key information 155 until the document processing engine 110 determines whether the encoding (determined at 414) of the column header field 424 is within a threshold distance (e.g., the threshold distance stored as part of the key information 155) from a predetermined encoding of a predefined column header field associated with a predefined field type stored in the database 150 as at least a part of the key information 155.

For example, the document processing engine 110 determines (e.g., iteratively) a distance between the encoding (determined at 414) of the column header field 424 and one or more of the predetermined encodings stored in the database 150. The distance may be at least one of a cosine similarity, an L1 norm, an L2 norm, a Chebyshev distance, and/or the like.

The document processing engine 110 compares the distance to the threshold distance, such as the threshold distance associated with each of the predetermined encodings stored in the database 150. The document processing engine 110 may continue to determine the distances and compare the distances to the threshold distances until the document processing engine 110 determines the distance is within (e.g., less than or equal to) a particular threshold distance stored as at least a part of the key information 155. In accordance with some example embodiments, the threshold distance includes a minimum of a pre-defined value and a threshold value including half a distance between the predetermined encoding of the predefined column header field and a closest second predetermined encoding of a second predefined column header field associated with a second predefined field type. And, as noted, the threshold distance may have been determined during the training phase and stored in the database 150 for each predetermined encoding.

In some embodiments, based on determining the distance between the encoding of the column header field 424 and a particular predetermined encoding is within the associated threshold distance, the document processing engine 110 assigns the predefined field type (assigned to the predetermined encoding) to the column header field 424 and/or the column header-column value pair including the particular column header field 424. The document processing engine 110 may do so for each column header field 424 and/or column header-column value pair extracted at 412.

In some embodiments, the document processing engine 110 does not assign the predefined field type to the column header field 424 when the document processing engine 110 determines that the distance between the encoding of the column header field 424 is not within any threshold distance associated with the predetermined encodings stored in the database 150. In such embodiments, the document processing engine 110 leaves the column header-column value pair including such column header field unassigned.

Together or separately with the list of the key-value pairs and assigned field types, the document processing engine 110 may compile a list of the column header-column value pairs and the assigned field types, at 410, for further processing. In some embodiments, the document processing engine 110 converts the table having a column-centered structure to a line item-centered representation, based at least on the dense representation for easier processing. In some embodiments, the assigned field type is included in the list with the line item-centered representation.

For example, the document processing engine 110 may perform a document processing operation based on each column header-column value pair and the predefined field type assigned to each column header-column value pair included in the list. The document processing operation may include at least one of applying an extraction model to the received document based on the assigned predefined field type and the column header-column value pair, applying correction logic to the received document based on the assigned predefined field type and the column header-column value pair to correct a value extracted from the received document, and applying a custom extraction model based on the assigned predefined field type and the column header-column value pair, among other operations.

FIG. 6 depicts a flowchart illustrating a process 600 for multi-language document field extraction, in accordance with some example embodiments. In some example embodiments, the process 600 may be performed by the document processing engine 110. The document processing engine 110 may receive a document including one or more document features, as described herein. In some embodiments, the document includes a plurality of key fields and a plurality of value fields. For example, the one or more document features may include a document header (e.g., a key field), a value field corresponding to the key field, a table header (e.g., a column header or key field), a column value field (e.g., a value field) corresponding to the column header field, a logo, sender information, and/or the like.

At 602, the document processing engine 110 (e.g., via the extractor 162) may determine a plurality of key-value pairs based on a received document including the plurality of key fields and the plurality of value fields. Each key-value pair of the plurality of key-value pairs may include a key field of the plurality of key fields and a value field of the plurality of value fields that corresponds to the key field. Additionally and/or alternatively, the document processing engine 110 determines a dense representation of a table included in the received document based on the received document. The dense representation includes an encoding of column headers of pairs of column headers and column values of the table. In some embodiments, as noted herein, the document processing engine 110 may, as part of determining the key-value pairs, determine the dense representation. Thus, while the process 600 generally refers to processing key-value pairs, the same process may be used to determine column header-column value pairs, consistent with embodiments of the current subject matter.

In some embodiments, the key field of the plurality of key-value pairs is associated with a first language and wherein the predefined key field is associated with a second language different from the first language. Thus, as noted, the document processing engine 110 may process documents in a variety of languages.

At 604, the document processing engine 110 may determine whether an encoding of the key field is within a threshold distance from a predetermined encoding of a predefined key field associated with a predefined field type. The document processing engine 110 may determine the encoding using a trained language model (e.g., the model 164) trained, based on a plurality of annotated documents including a plurality of languages, to identify the predefined field type.

As described herein, the encoding may include a representation, such as a numeric representation, of the key field. The encoding of the key field of the plurality of key-value pairs may be generated based at least on context information (e.g., the size and/or position of the column header fields and/or key fields in the received document, a coordinate such as an x-coordinate and/or a y-coordinate of the column header fields and/or key fields in the received document, and/or the like) associated with one or more nearby key fields. In some embodiments, the encoding of the key field is generated by at least masking one or more key fields of the received document that include a numeric digit.

In embodiments in which the document processing engine 110 determines the dense representation of the table, the document processing engine 110 may determine whether the encoding of a column header of a pair of column headers and column values is within a table threshold distance from a predetermined table encoding of a predefined column header associated with a predefined column type. In some embodiments, as noted herein, the document processing engine 110 may, as part of determining the encoding of the key field, determine the encoding of the column header.

The threshold distance is at least one of a cosine similarity, an L1 norm, a L2 norm, a Chebyshev distance. The threshold distance may include a minimum of a pre-defined value and a threshold value including half a distance between the predetermined encoding of the predefined key field and a closest second predetermined encoding of a second predefined key field associated with a second predefined field type. In some embodiments, the threshold distance includes the pre-defined value and/or the threshold value including half the distance between the predetermined encoding of the predefined key field and the closest second predetermined encoding of the second predefined key field associated with the second predefined field type.

In some embodiments, the document processing engine 110 iteratively determines whether the encoding of the key field is within the threshold distance from a plurality of predetermined encodings, including the predetermined encoding, until a distance between the encoding and the predetermined encoding is determined to be within the threshold distance. In this way, the document process engine 110 may determine the predefined field type to assign to the key field based on the predefined field types and encodings stored in the database 150.

At 606, the document processing engine 110 assigns the predefined field type to the corresponding key-value pair based on determining the encoding of the key field is within the threshold distance. In embodiments in which the document processing engine 110 determines the dense representation of the table, the document processing engine 110 may assign the predefined column type to the pair of column headers and column values based on determining the encoding of the column header is within the table threshold distance. As noted herein, the document processing engine 110 may, as part of assigning the predefined field type to the corresponding key-value pair, assign the predefined column type.

At 608, the document processing engine 110 performs a document processing operation based on each key-value pair and the predefined field type assigned to each key-value pair. Additionally and/or alternatively, the document processing engine 110 performs the document processing operation based on the assigned predefined column type and the pair of column headers and column values. The document processing operation includes at least one of applying an extraction model to the received document based on the assigned predefined field type and the key-value pair, applying correction logic to the received document based on the assigned predefined field type and the key-value pair to correct a value extracted from the received document, and applying a custom extraction model based on the assigned predefined field type and the key-value pair. Thus, the document processing operation may be more efficiently and/or accurately performed based on the accurate and precise identification of the key-value pairs and/or column header-column value pairs.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions which, when executed by the at least one data processor, result in operations comprising: determining, based on a received document including a plurality of key fields and a plurality of value fields, a plurality of key-value pairs, wherein each key-value pair of the plurality of key-value pairs includes a key field of the plurality of key fields and a value field of the plurality of value fields that corresponds to the key field; determining whether an encoding of the key field is within a threshold distance from a predetermined encoding of a predefined key field associated with a predefined field type, wherein the encoding includes a numeric representation of the key field; assigning, based at least on determining the encoding of the key field is within the threshold distance, the predefined field type to the key-value pair including the key field; and performing a document processing operation based on each key-value pair and the predefined field type assigned to each key-value pair.

Example 2: The system of example 1, wherein the key field of the plurality of key-value pairs is associated with a first language and wherein the predefined key field is associated with a second language different from the first language.

Example 3: The system of any one of examples 1 to 2, wherein the threshold distance includes a minimum of a pre-defined value and a threshold value including half a distance between the predetermined encoding of the predefined key field and a closest second predetermined encoding of a second predefined key field associated with a second predefined field type.

Example 4: The system of any one of examples 1 to 3, wherein the threshold distance is at least one of a cosine similarity, an L1 norm, a L2 norm, a Chebyshev distance.

Example 5: The system of any one of examples 1 to 4, wherein the operations further comprise: iteratively determining whether the encoding of the key field is within the threshold distance from a plurality of predetermined encodings including the predetermined encoding until a distance between the encoding and the predetermined encoding is determined to be within the threshold distance.

Example 6: The system of any one of examples 1 to 5, wherein the operations further comprise: determining, based on the received document, a dense representation of a table included in the received document, wherein the dense representation includes an encoding of column headers of pairs of column headers and column values of the table; determining whether the encoding of a column header of a pair of column headers and column values is within a table threshold distance from a predetermined table encoding of a predefined column header associated with a predefined column type; assigning, based on determining the encoding of the column header is within the table threshold distance, the predefined column type to the pair of column headers and column values; and performing the document processing operation based on the assigned predefined column type and the pair of column headers and column values.

Example 7: The system of any one of examples 1 to 6, wherein the encoding of the key field of the plurality of key-value pairs is generated based at least on context information associated with one or more nearby key fields, and wherein the encoding of the key field is generated by at least masking one or more key fields of the received document that include a numeric digit.

Example 8: The system of any one of examples 1 to 7, wherein the encoding is determined by a trained language model trained, based on a plurality of annotated documents including a plurality of languages, to identify the predefined field type.

Example 9: The system of any one of examples 1 to 8, wherein the document processing operation includes at least one of applying an extraction model to the received document based on the assigned predefined field type and the key-value pair, applying correction logic to the received document based on the assigned predefined field type and the key-value pair to correct a value extracted from the received document, and applying a custom extraction model based on the assigned predefined field type and the key-value pair.

Example 10: A computer-implemented method, comprising: determining, based on a received document including a plurality of key fields and a plurality of value fields, a plurality of key-value pairs, wherein each key-value pair of the plurality of key-value pairs includes a key field of the plurality of key fields and a value field of the plurality of value fields that corresponds to the key field; determining whether an encoding of the key field is within a threshold distance from a predetermined encoding of a predefined key field associated with a predefined field type, wherein the encoding includes a numeric representation of the key field; assigning, based at least on determining the encoding of the key field is within the threshold distance, the predefined field type to the key-value pair including the key field; and performing a document processing operation based on each key-value pair and the predefined field type assigned to each key-value pair.

Example 11: The method of any example 10, wherein the key field of the plurality of key-value pairs is associated with a first language and wherein the predefined key field is associated with a second language different from the first language.

Example 12: The method of any one of examples 10 to 11, wherein the threshold distance includes a minimum of a pre-defined value and a threshold value including half a distance between the predetermined encoding of the predefined key field and a closest second predetermined encoding of a second predefined key field associated with a second predefined field type.

Example 13: The method of any one of examples 10 to 12, wherein the threshold distance is at least one of a cosine similarity, an L1 norm, a L2 norm, a Chebyshev distance.

Example 14: The method of any one of examples 10 to 13, further comprising: iteratively determining whether the encoding of the key field is within the threshold distance from a plurality of predetermined encodings including the predetermined encoding until a distance between the encoding and the predetermined encoding is determined to be within the threshold distance.

Example 15: The method of any one of examples 10 to 14, further comprising: determining, based on the received document, a dense representation of a table included in the received document, wherein the dense representation includes an encoding of column headers of pairs of column headers and column values of the table; determining whether the encoding of a column header of a pair of column headers and column values is within a table threshold distance from a predetermined table encoding of a predefined column header associated with a predefined column type; assigning, based on determining the encoding of the column header is within the table threshold distance, the predefined column type to the pair of column headers and column values; and performing the document processing operation based on the assigned predefined column type and the pair of column headers and column values.

Example 16: The method of any one of examples 10 to 15, wherein the encoding of the key field of the plurality of key-value pairs is generated based at least on context information associated with one or more nearby key fields, and wherein the encoding of the key field is generated by at least masking one or more key fields of the received document that include a numeric digit.

Example 17: The method of any one of examples 10 to 16, wherein the encoding is determined by a trained language model trained, based on a plurality of annotated documents including a plurality of languages, to identify the predefined field type.

Example 18: The method of any one of examples 10 to 17, wherein the document processing operation includes at least one of applying an extraction model to the received document based on the assigned predefined field type and the key-value pair, applying correction logic to the received document based on the assigned predefined field type and the key-value pair to correct a value extracted from the received document, and applying a custom extraction model based on the assigned predefined field type and the key-value pair.

Example 19: A non-transitory computer-readable medium storing instructions, which when executed by at least one data processor, result in operations comprising: determining, based on a received document including a plurality of key fields and a plurality of value fields, a plurality of key-value pairs, wherein each key-value pair of the plurality of key-value pairs includes a key field of the plurality of key fields and a value field of the plurality of value fields that corresponds to the key field; determining whether an encoding of the key field is within a threshold distance from a predetermined encoding of a predefined key field associated with a predefined field type, wherein the encoding includes a numeric representation of the key field; assigning, based at least on determining the encoding of the key field is within the threshold distance, the predefined field type to the key-value pair including the key field; and performing a document processing operation based on each key-value pair and the predefined field type assigned to each key-value pair.

Example 20: The non-transitory computer-readable medium of example 19, wherein the key field of the plurality of key-value pairs is associated with a first language and wherein the predefined key field is associated with a second language different from the first language.

Figure 7:
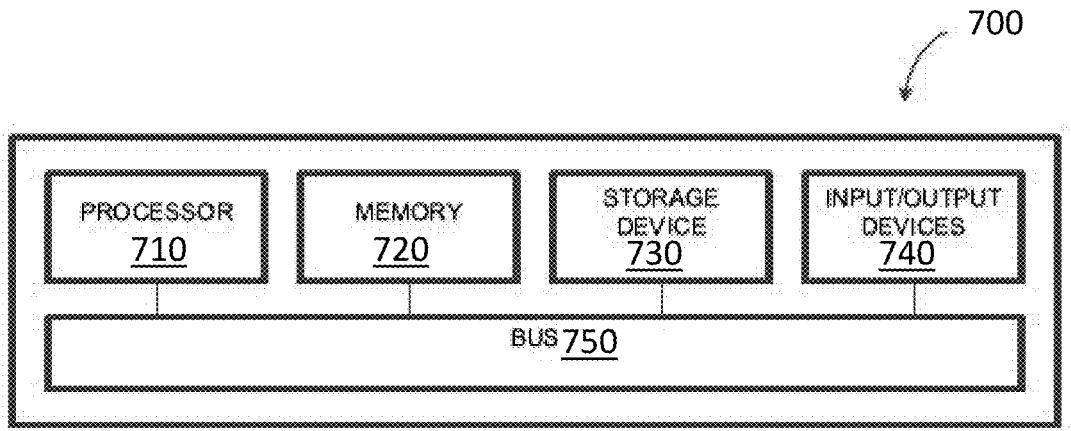
FIG. 7 depicts a block diagram illustrating a computing system, in accordance with some example embodiments.

FIG. 7 depicts a block diagram illustrating a computing system 700 consistent with implementations of the current subject matter. Referring to FIGS. 1-7, the computing system 700 can be used to implement the document field identification system 100, the document processing engine 110, and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the document field identification system 100 and/ or the document processing engine 110. In some example embodiments, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a solid state drive, a floppy disk device, a hard disk device, an optical disk device, or a tape device, or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some example embodiments, the input/ output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some example embodiments, the computing system 700 can be used to execute various interactive computer software applications that can be used for organization, analysis and/or storage of data in various formats. Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include client devices and servers. A client device and server are generally remote from each other and typically interact through a communication network. The relationship of client device and server arises by virtue of computer programs running on the respective computers and having a client device-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
at least one data processor; and
at least one memory storing instructions which, when executed by the at least one data processor, result in operations comprising:
  determining, using a document processing engine including one or more machine learning models and based on a received scanned document including a plurality of key fields and a plurality of value fields, a plurality of key-value pairs, wherein each key-value pair of the plurality of key-value pairs includes a key field of the plurality of key fields and a value field of the plurality of value fields that corresponds to the key field, wherein the one or more machine learning models of the document processing engine are trained based on a plurality of sample documents to process scanned documents that use one or more first languages, and at least one of the plurality of key-value pairs from the received scanned document is in a second language different than the one or more first languages;
  determining whether an encoding of the key field is within a threshold distance from a predetermined encoding of a predefined key field associated with a predefined field type, wherein the encoding includes a numeric representation of the key field, wherein the threshold distance includes a minimum of a pre-defined value and a threshold value including half a distance between the predetermined encoding of the predefined key field and a closest second predetermined encoding of a second predefined key field associated with a second predefined field type;
  assigning, based at least on determining the encoding of the key field is within the threshold distance, the predefined field type to the key-value pair including the key field; and
  extracting data from the received scanned document, at least a portion of which is in the second language, based on each key-value pair and the predefined field type assigned to each key-value pair.

2. The system of claim 1, wherein the key field of the plurality of key-value pairs is associated with a first language of the one or more first languages, and wherein the predefined key field is associated with the second language.

3. The system of claim 1, wherein the threshold distance is at least one of a cosine similarity, an L1 norm, a L2 norm, a Chebyshev distance.

4. The system of claim 1, wherein the operations further comprise: iteratively determining whether the encoding of the key field is within the threshold distance from a plurality of predetermined encodings including the predetermined encoding until a distance between the encoding and the predetermined encoding is determined to be within the threshold distance.

5. The system of claim 1, wherein the operations further comprise:
  determining, based on the received document, a dense representation of a table included in the received document, wherein the dense representation includes an encoding of column headers of pairs of column headers and column values of the table;
  determining whether the encoding of a column header of a pair of column headers and column values is within a table threshold distance from a predetermined table encoding of a predefined column header associated with a predefined column type;
  assigning, based on determining the encoding of the column header is within the table threshold distance, the predefined column type to the pair of column headers and column values; and
  performing the document processing operation based on the assigned predefined column type and the pair of column headers and column values.

6. The system of claim 1, wherein the encoding of the key field of the plurality of key-value pairs is generated based at least on context information associated with one or more nearby key fields, and wherein the encoding of the key field is generated by at least masking one or more key fields of the received document that include a numeric digit.

7. The system of claim 1, wherein the encoding is determined by a trained language model trained, based on a plurality of annotated documents including a plurality of languages, to identify the predefined field type.

8. The system of claim 1, wherein the document processing operation includes at least one of applying an extraction model to the received document based on the assigned predefined field type and the key-value pair, applying correction logic to the received document based on the assigned predefined field type and the key-value pair to correct a value extracted from the received document, and applying a custom extraction model based on the assigned predefined field type and the key-value pair.

9. A computer-implemented method, comprising:
  determining, using a document processing engine including one or more machine learning models and based on a received scanned document including a plurality of key fields and a plurality of value fields, a plurality of key-value pairs, wherein each key-value pair of the plurality of key-value pairs includes a key field of the plurality of key fields and a value field of the plurality of value fields that corresponds to the key field, wherein the one or more machine learning models of the document processing engine are trained based on a plurality of sample documents to process scanned documents that use one or more first languages, and at least one of the plurality of key-value pairs from the received scanned document is in a second language different than the one or more first languages;

determining whether an encoding of the key field is within a threshold distance from a predetermined encoding of a predefined key field associated with a predefined field type, wherein the encoding includes a numeric representation of the key field, wherein the threshold distance includes a minimum of a pre-defined value and a threshold value including half a distance between the predetermined encoding of the predefined key field and a closest second predetermined encoding of a second predefined key field associated with a second predefined field type;

assigning, based at least on determining the encoding of the key field is within the threshold distance, the predefined field type to the key-value pair including the key field; and extracting data from the received scanned document, at least a portion of which is in the second language, based on each key-value pair and the predefined field type assigned to each key-value pair.

10. The method of claim 9, wherein the key field of the plurality of key-value pairs is associated with a first language of the one or more first languages, and wherein the predefined key field is associated with the second language.

11. The method of claim 9, wherein the threshold distance is at least one of a cosine similarity, an L1 norm, a L2 norm, a Chebyshev distance.

12. The method of claim 9, further comprising: iteratively determining whether the encoding of the key field is within the threshold distance from a plurality of predetermined encodings including the predetermined encoding until a distance between the encoding and the predetermined encoding is determined to be within the threshold distance.

13. The method of claim 9, further comprising:

determining, based on the received document, a dense representation of a table included in the received document, wherein the dense representation includes an encoding of column headers of pairs of column headers and column values of the table;

determining whether the encoding of a column header of a pair of column headers and column values is within a table threshold distance from a predetermined table encoding of a predefined column header associated with a predefined column type;

assigning, based on determining the encoding of the column header is within the table threshold distance, the predefined column type to the pair of column headers and column values; and performing the document processing operation based on the assigned predefined column type and the pair of column headers and column values.

14. The method of claim 9, wherein the encoding of the key field of the plurality of key-value pairs is generated based at least on context information associated with one or more nearby key fields, and wherein the encoding of the key field is generated by at least masking one or more key fields of the received document that include a numeric digit.

15. The method of claim 9, wherein the encoding is determined by a trained language model trained, based on a plurality of annotated documents including a plurality of languages, to identify the predefined field type.

16. The method of claim 9, wherein the document processing operation includes at least one of applying an extraction model to the received document based on the assigned predefined field type and the key-value pair, applying correction logic to the received document based on the assigned predefined field type and the key-value pair to correct a value extracted from the received document, and applying a custom extraction model based on the assigned predefined field type and the key-value pair.

17. A non-transitory computer-readable medium storing instructions, which when executed by at least one data processor, result in operations comprising:

determining, using a document processing engine including one or more machine learning models and based on a received scanned document including a plurality of key fields and a plurality of value fields, a plurality of key-value pairs, wherein each key-value pair of the plurality of key-value pairs includes a key field of the plurality of key fields and a value field of the plurality of value fields that corresponds to the key field, wherein the one or more machine learning models of the document processing engine are trained based on a plurality of sample documents to process scanned documents that use one or more first languages, and at least one of the plurality of key-value pairs from the received scanned document is in a second language different than the one or more first languages;

determining whether an encoding of the key field is within a threshold distance from a predetermined encoding of a predefined key field associated with a predefined field type, wherein the encoding includes a numeric representation of the key field, wherein the threshold distance includes a minimum of a pre-defined value and a threshold value including half a distance between the predetermined encoding of the predefined key field and a closest second predetermined encoding of a second predefined key field associated with a second predefined field type;

assigning, based at least on determining the encoding of the key field is within the threshold distance, the predefined field type to the key-value pair including the key field; and extracting data from the received scanned document, at least a portion of which is in the second language, based on each key-value pair and the predefined field type assigned to each key-value pair.

18. The non-transitory computer-readable medium of claim 17, wherein the key field of the plurality of key-value pairs is associated with a first language of the one or more first languages, and wherein the predefined key field is associated with the second language.

* * * * *